US008113398B2

(12) United States Patent
Sautter et al.

(10) Patent No.: US 8,113,398 B2
(45) Date of Patent: Feb. 14, 2012

(54) HITCH MOUNTED BICYCLE RACKS FOR VEHICLES

(75) Inventors: Chris Sautter, Portland, OR (US);
Richard Jeli, Milwaukie, OR (US);
Andrew Austin, Sherwood, OR (US);
Mike Kemery, Portland, OR (US); Zac Elder, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 390 days.

(21) Appl. No.: 12/217,767

(22) Filed: Jul. 7, 2008

(65) Prior Publication Data
US 2009/0236382 A1 Sep. 24, 2009

Related U.S. Application Data

(60) Provisional application No. 60/958,520, filed on Jul. 6, 2007.

(51) Int. Cl.
*B60R 9/10* (2006.01)
(52) U.S. Cl. ........ 224/497; 224/509; 224/531; 224/537; 224/924
(58) Field of Classification Search .................. 224/924, 224/497, 509, 531, 537
See application file for complete search history.

(56) References Cited

U.S. PATENT DOCUMENTS

| 6,640,979 | B1 * | 11/2003 | Mayfield | 211/20 |
|---|---|---|---|---|
| 6,868,998 | B2 * | 3/2005 | Dean | 224/324 |
| 7,104,430 | B2 * | 9/2006 | Reeves | 224/536 |
| 7,222,763 | B2 * | 5/2007 | Pedrini | 224/519 |
| 7,240,816 | B2 * | 7/2007 | Tsai | 224/501 |
| 7,648,151 | B2 * | 1/2010 | Pedrini | 280/292 |
| 7,784,656 | B2 * | 8/2010 | Morrill et al. | 224/504 |
| 2004/0238582 | A1 * | 12/2004 | Pedrini | 224/519 |
| 2006/0029483 | A1 * | 2/2006 | Allen et al. | 410/30 |
| 2007/0164065 | A1 * | 7/2007 | Davis | 224/324 |
| 2008/0164292 | A1 * | 7/2008 | Farney | 224/324 |
| 2009/0120984 | A1 * | 5/2009 | Sautter et al. | 224/497 |

FOREIGN PATENT DOCUMENTS

| EP | 989029 A1 * | 3/2000 |
|---|---|---|
| EP | 1568542 A1 * | 8/2005 |

* cited by examiner

*Primary Examiner* — Justin Larson
(74) *Attorney, Agent, or Firm* — Kolisch Hartwell, P.C.

(57) ABSTRACT

A compact carrier apparatus includes one or more bicycle carriers. Each carrier includes wheel support sections configured to engage front and rear bicycle wheels, and a stabilizing arm with a gripping member configured to grip one of the wheels. A wheel support section includes a wheel engagement member disposed on an outer edge of the carrier support structure and oriented so that an engaged wheel projects beyond the outer edge. A bracing arm may selectively extend in a cantilevered fashion relative to the support structure to provide an additional load-bearing support point for such a wheel. The stabilizing arm may be mounted to the support structure at a location rearward of a wheel engagement member, and pivotable to a carrying position to grip the wheel. The path of the stabilizing arm, in the carrying position, traverses the center of the wheel and avoids passing over the fork or the brakes.

8 Claims, 7 Drawing Sheets

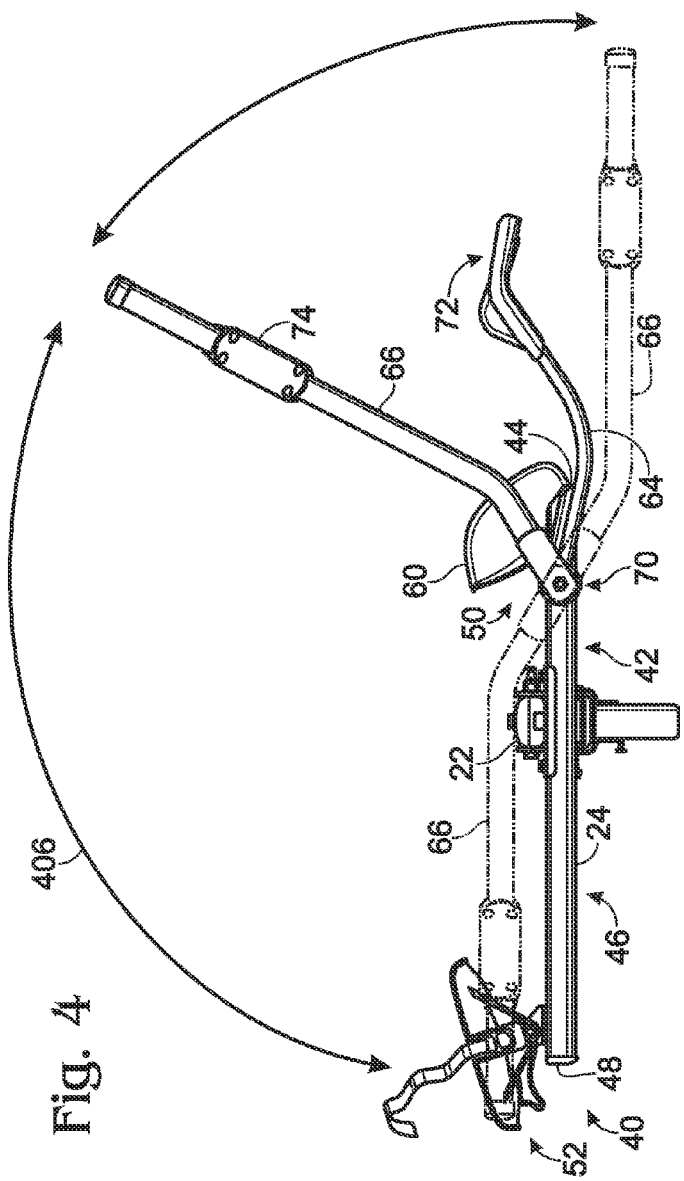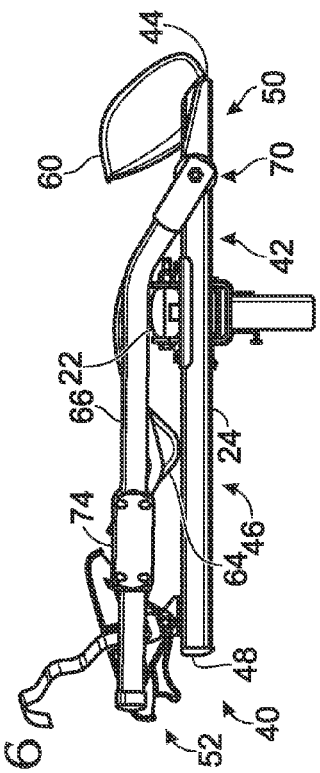

HITCH MOUNTED BICYCLE RACKS FOR VEHICLES

CROSS-REFERENCE TO RELATED APPLICATION

This application is based upon and claims priority under 35 U.S.C. §119 from U.S. Provisional Patent Application Ser. No. 60/958,520 filed on Jul. 6, 2007 and is entitled "Hitch Mounted Bicycle Racks for Vehicles." The complete disclosure of the above-identified patent application is hereby incorporated by reference in its entirety for all purposes.

This application also incorporates by reference in its entirety for all purposes U.S. patent application Ser. No. 11/111,301 filed on Apr. 20, 2005.

FIELD OF THE DISCLOSURE

The present disclosure is related to bicycle mounts. More specifically, the present disclosure is directed to bicycle racks for vehicles.

BACKGROUND

Generally, bicycles may be attached to a vehicle rack structure by means of the bicycle frame, wheels, or a combination thereof. Frame attachment may be secure, but the rigidity of a bicycle frame may result in the transfer of potentially damaging forces from the vehicle to the bicycle, for example while driving the vehicle. As a result, the frame may be structurally damaged or misaligned. In addition, points of engagement on the frame may become cosmetically damaged, such as by being dented or scratched. Bicycle tires have an inherent shock-absorbing ability, which may reduce the effect of sudden vehicle motions on a bicycle attached to a rack via one or more wheels.

Vehicle rack structures for attachment to the rear of a vehicle generally incorporate components to receive the front and rear wheels of a bicycle, which generally engage the bottom and/or outer curve of the wheels. As such, the racks of this configuration are typically as long as the bicycle itself, requiring a long and often heavy structure for each bicycle. Additionally, even if such racks are designed to accommodate bicycles of different frame configurations and/or sizes, such as by means of adjustable wheel engaging components and/or stabilizing members that attach to the frame or wheels, vehicle rack structures are generally required to be designed to accommodate the largest of a range of bicycle sizes, resulting in excess structure and bulkiness when the rack is used with smaller-sized bicycles.

SUMMARY

A compact carrier apparatus that includes one or more bicycle carriers is provided, each carrier including first and second wheel support sections configured to engage and support the front and rear bicycle wheels, respectively, and a stabilizing arm that includes a gripping member configured to grip one of the wheels, usually the front wheel. At least one of the wheel support sections includes a wheel engagement member disposed on an outer edge of the carrier support structure and oriented relative to the carrier so that an engaged wheel projects beyond the outer edge. Some embodiments further include a bracing arm mounted to the support structure and selectively moveable to extend outward in a cantilevered fashion relative to the support structure to provide an additional load-bearing support point for a bicycle wheel engaged in such a wheel engagement member. In some embodiments, the stabilizing arm is pivotably mounted to the carrier support structure at a location rearward of such a wheel engagement member, and selectively moveable to a carrying position in which the stabilizing arm extends across the diameter of a held wheel to grip the wheel. In such embodiments, the longitudinal profile of the stabilizing arm is configured such that the path of the arm, in the carrying position, traverses the center of the wheel and avoids passing over the fork or the brakes.

BRIEF DESCRIPTION OF DRAWINGS

FIG. 4 is another elevation view of the carrier apparatus of FIG. 1, showing an illustrative range of motion of the stabilizing arm.

FIG. 6 is another elevation view of the carrier apparatus of FIG. 1, showing components of a single carrier in a stowed position.

DETAILED DESCRIPTION

Figure 1:
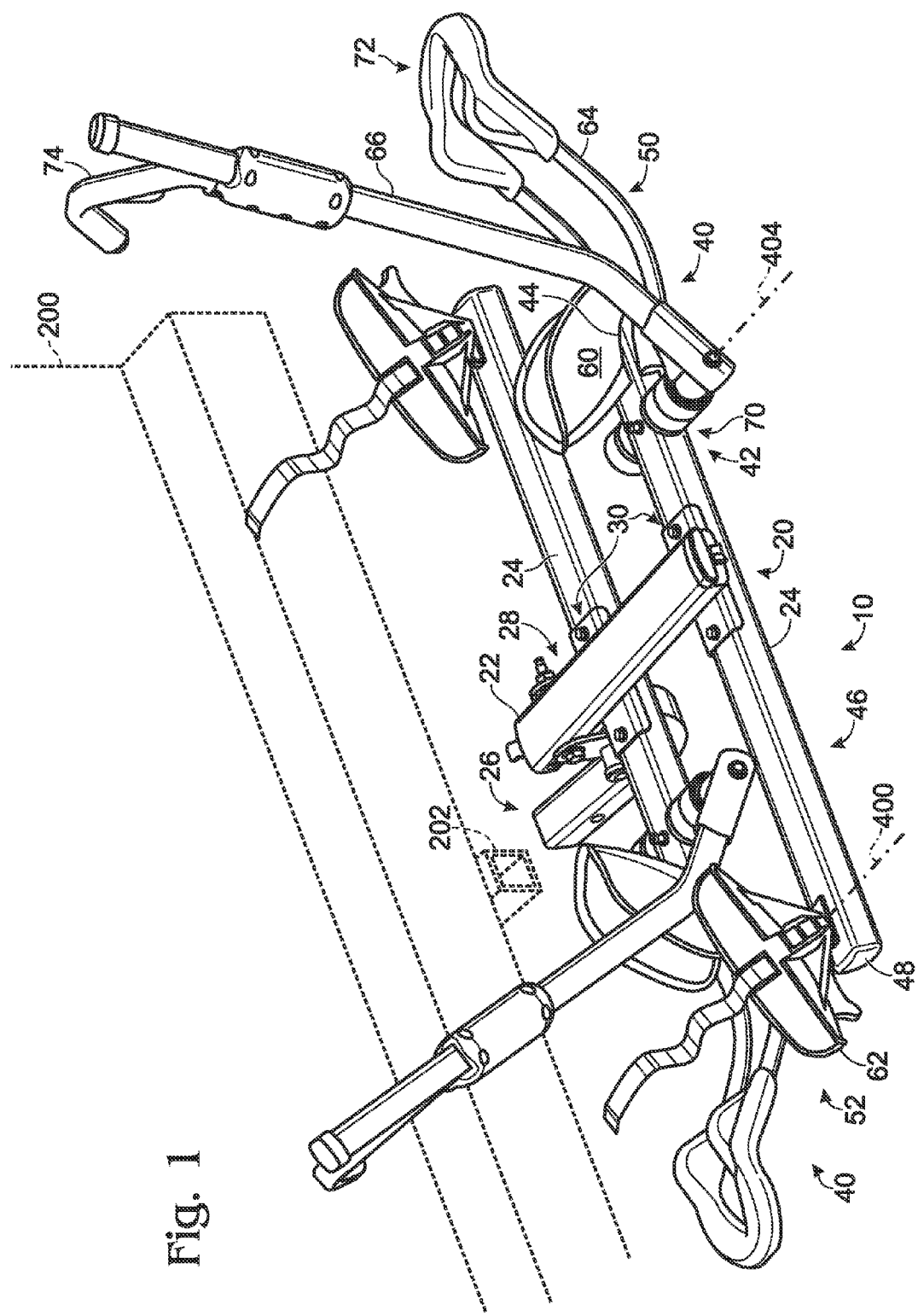
FIG. 1 is an isometric view of a first embodiment of a carrier apparatus constructed according to the present disclosure.

The present disclosure provides a compact carrier apparatus for carrying one or more bicycles on the rear of a vehicle, each bicycle carrier of the apparatus including first and second wheel support sections for engaging and supporting the front and rear bicycle wheels, and a stabilizing arm that includes a gripping member configured to grip one of the wheels, usually the front wheel.

One or both wheel support sections may include a wheel engagement member mounted on an external edge of a component carrier support structure, such as on one end of a transverse cross member, and oriented outward relative to the carrier such that a wheel received in the member projects beyond the edge of the structure. Such a wheel engagement member may provide a load-bearing support point for a bicycle wheel.

Some embodiments further include a bracing arm mounted to the carrier support structure and configured to selectively pivot, or otherwise move, between a carrying position, in which the bracing arm extends in a cantilevered relation to the support structure, and a stowed position, in which the bracing arm may be folded generally against the support structure. In the carrying position, the bracing arm cooperates with a wheel engagement member to provide an additional load-bearing support point, typically spaced away from the wheel engagement member on the bottom half of a wheel received in the wheel engagement member. In such embodiments, the stabilizing arm may also cooperate with the wheel engagement member and the bracing arm to selectively grip the captured wheel at a wheel location on the upper half of the wheel or otherwise between the wheel locations engaged by the wheel engagement member and the bracing arm. Such a configuration provides three positions of engagement, two on the bottom half and one on the top half of the wheel, generally forming a triangle surrounding the wheel center.

In some embodiments, the stabilizing arm is coupled to the carrier support structure behind, or rearward of, a wheel engagement member positioned on the edge of the carrier support structure, such that the stabilizing arm may extend outward from the carrier support structure to grip a wheel engaged in the engagement member. The stabilizing arm in such embodiments is pivotable between this position, which may also be referred to as a carrying position, and a stowed position in which it may be folded generally against the support structure. In some embodiments, the pivot axis of the stabilizing arm may be coaxial with the pivot axis of the bracing arm, and both arms may be locked into a carrying position to hold the wheel.

When held on the carrier apparatus, a wheel, usually the front wheel, projects outward beyond the edge of the carrier support structure, such that the wheel center, or hub, is horizontally disposed beyond the longitudinal width of the support structure, and vertically disposed above the longitudinal axis of the support structure (such as that of a transverse cross beam). In some embodiments, the stabilizing arm has a bent configuration so that the path defined by the arm, when placed into a carrying position, extends outward from the carrier support structure and bends generally at an angle so that an upper portion of the arm traverses the center of the held wheel, and grips the wheel at a location on the upper half of the wheel. Such a configuration may allow the arm to avoid contacting the bicycle fork or brakes when engaged with the wheel. Further, the gripping member may be selectively moved along the length of the arm, to accommodate a variety of bicycle wheel sizes while avoiding contact with the bicycle fork, brakes, or other parts of the bicycle frame.

FIG. 1 shows an embodiment of a carrier apparatus 10 constructed in accordance with this disclosure. Carrier apparatus 10 includes a carrier support structure, generally designated at 20, which is shown to include a central support member 22 and a pair of cross members 24. Carrier apparatus 10 may be mounted to a vehicle 200, for example at a vehicle hitch 202, via a suitable mounting assembly 26. As shown, mounting assembly 26 projects rearward from the vehicle hitch 202 and then bends upward, such as to provide a desired degree of ground clearance. A carrier support pivoting assembly 28 is shown to be disposed on an upper portion of the mounting assembly 26 and, is configured to allow carrier apparatus 10 to be selectively moved from an operative extended position, as shown, to an inoperative folded position in which central support member 22 is positioned in an upright orientation. However, any satisfactory manner of mounting mechanism(s) may be employed.

Mounted and positioned as shown, central support member 22 extends generally rearward of mounting assembly 26, and vehicle 200. Cross members 24 are mounted to central support member 22 by any suitable means, such as via brace assemblies 30. As shown, cross members 24 are mounted to a lower surface of central support member 22 and extend transversely relative thereto.

As shown in the illustrated embodiment, each cross member is configured to support a bicycle in a manner explained in detail below, and includes structure collectively referred to herein as a carrier, designated generally at 40. Each carrier is configured to support one bicycle, and as such, the carrier apparatus 10 of the illustrated embodiment is thus adapted to carry two bicycles, generally in a spaced-apart, opposed relation to each other, with each bicycle oriented roughly parallel to the rear of the vehicle. However, it is within the scope of this disclosure that a carrier apparatus may be adapted to include any number of carriers, e.g., one, two, three, four, or any other desired number, and in any desired relative configuration. Further, although carrier apparatus 10 is shown to include carrier support structure 20 in the form of a central support member 22 and two transversely mounted cross members 24, it is within the scope of this disclosure that any desired structural configuration may be incorporated, including, for example, a U-shaped or bifurcated support structure, a generally hoop-shaped or rectangular support structure, or any support structure suitable for supporting one or more carriers 40 relative to a vehicle 200.

Figure 2:
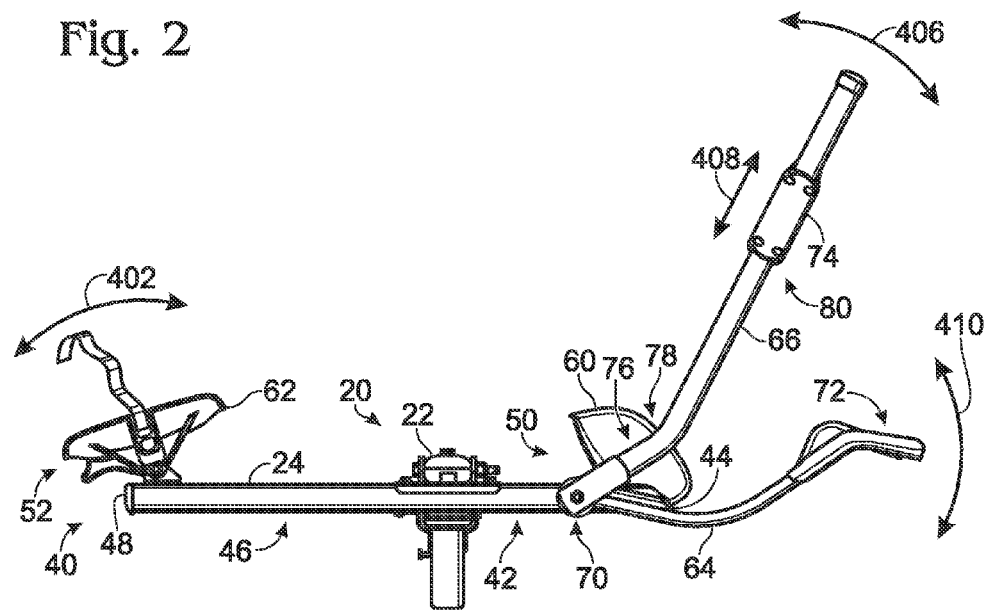
FIG. 2 is an elevation view showing components of a single carrier, and associated carrier support structure, of the carrier apparatus of FIG. 1 in a carrying position.

Generally speaking, and as can also be seen in FIG. 2, each carrier 40 includes a front portion 42 defined by a front edge 44, and a rear portion 46 defined by a rear edge 48. The front and rear portions are shown in the illustrated embodiment as the opposing end portions of a cross member 24, with the front and rear edges corresponding to the ends of the cross member, but these terms are used herein merely for convenience and do not require the illustrated configuration.

Carrier 40 includes a first wheel support section 50 configured to support a first bicycle wheel, usually a front wheel, and a second wheel support section 52 configured to support a second bicycle wheel, usually a rear wheel. First wheel support section 50 further includes a first wheel engagement member 60 mounted to the cross member 24 at one end (shown as the front edge 44 of front portion 42), and second wheel support section 60 further includes a second wheel engagement member 62 mounted to the cross member near the opposite end. The wheel engagement members may have any suitable configuration adapted to hold a peripheral portion of a bicycle wheel, usually by contact with the tire portion of the wheel. As shown, the wheel engagement members are separate components mounted to the framework of carrier apparatus 10, but other embodiments may include wheel engagement members that are integral with, or even recessed into, the carrier support structure. For example, cross member 24 may have concave cross-section throughout portions of its length, a configuration sometimes referred to as a "tray." As shown, wheel engagement members 60, 62 are shown to provide a concave inner surface that is at least partially complementary to a perimetrical transverse section of the wheel. More particularly, the inner portion of each wheel engagement member includes an arcuate configuration with a radius suitable to accommodate a bicycle tire. Other configurations may be suitable, such as an angular surface, an irregular or variegated surface, and so forth.

The wheel engagement members may have a fixed position relative to the carrier support structure, or may have an adjustable position. For example, wheel engagement members 60, 62 are both fixed longitudinally relative to the cross member. Moreover, first wheel engagement member 60 is also fixed in orientation: the wheel engagement member is oriented outward relative to the frame such that, as described below and as can be seen, for example, in FIGS. 7-9, a wheel 210 held in engagement member 60 projects beyond the front edge 44 of the carrier support structure 20 such that the center of the wheel is horizontally disposed beyond a predetermined longitudinal dimension, such as the width defined by the front and rear edges, of the support structure.

Figure 3:
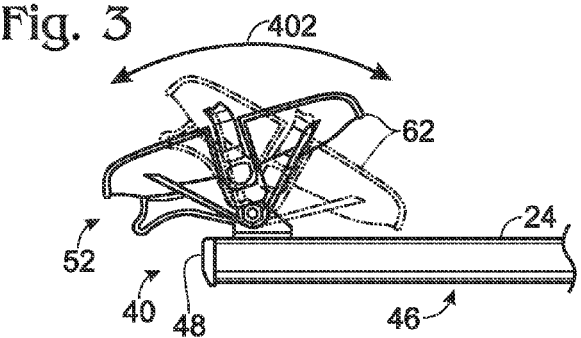
FIG. 3 is another elevation view of the carrier apparatus of FIG. 1, showing an illustrative range of motion of a wheel engagement member.

In contrast, second wheel engagement member 62 is configured to rock, or pivot, in a limited range of motion about an axis 400 (shown in FIG. 1), as indicated by arrow 402 (shown in FIGS. 2 and 3), such as between the illustrative positions shown in solid and dashed lines in FIG. 3. By pivoting, engagement member 62 cooperates with components of the first wheel support section to allow the carrier to be used with a wide range of bicycle sizes and styles, as explained below and as can be seen, for example, in FIG. 9.

One or both wheel engagement members may optionally include wheel retention components, such as to secure the held portion of the wheel against the engagement member for stability during transport and/or loading, security against theft, and so forth. For example, wheel engagement member 62 is shown to include a strap and latch arrangement, but any suitable structure may be used.

In addition to wheel engagement member 60, first wheel support section 50 also includes a bracing arm 64 mounted to carrier support structure 20 at a point 70, which is located rearward of the first wheel engagement member 60 on cross member 24. Carrier 40 also includes a stabilizing arm 66 mounted at point 70. In the illustrated embodiment, point 70 defines a common pivot axis 404 (shown in FIG. 1) for both arms, but alternative embodiments may include parallel, or otherwise separate, pivot axes for the arms, or may include any suitable linkage(s) to provide movement of one or both arms relative to the carrier support structure 20 and/or to each other. In the illustrated embodiment, arms 64, 66 cooperate with first wheel engagement member 60 to securely hold a wheel of a bicycle and thereby carry a bicycle on carrier 40.

Arms 64, 66 may have any suitable structure. As shown in FIG. 1, bracing arm 64 has an extended arch-like structure, also referred to as a hoop, that has a distal portion (or arch portion) 72 that has a shaped inner surface which, like the inner portions of the wheel engagement members 60, 62, may be configured to engage a peripheral portion of a bicycle wheel. The bracing arm 64 is also configured to provide clearance on either side of a wheel engaged in the arched portion so that the arched portion is the only part of the arm that contacts the bicycle. As such, the length of bracing arm 64, or more particularly the distance between first wheel engagement member 60 and the arched portion 72 of the bracing arm, may be selected to space the engagement member 60 and arched portion 72 close enough together so that a small wheel will be engaged by both components, while simultaneously being spaced far enough apart to provide two separate load-bearing support points on the bottom half of a held wheel.

More particularly, and as shown in FIG. 2, bracing arm 64 may be selectively pivoted to extend generally outward from the mounting point 70 in a cantilevered relation relative to carrier support structure 20. In such a position, which may be referred to as a carrying position, the first wheel engagement member 60 may provide a first load-bearing support point for a bicycle wheel, such as by engaging an interior (i.e., near the other wheel) bottom quarter of the wheel, and the arched portion 72 of bracing arm 64 may provide a second load-bearing support point for the wheel, such as by engaging an exterior (i.e., distal the other wheel) bottom quarter of the wheel. The first wheel support section 50 thereby provides two load-bearing support points for supporting a wheel of the bicycle in spaced relation and at two wheel locations on the bottom half of the wheel.

The configuration of stabilizing arm 66 is shown as an extended rod having a generally hook-shaped gripping member 74 near the distal end. Gripping member 74 is selectively moveable along a length of the arm, and is configured to be selectively positioned to secure a bicycle on the carrier. Somewhat similar to the bracing arm 64, the stabilizing arm may otherwise be configured to have sufficient clearance from the secured wheel so that the gripping member 74 is the only part of the arm that contacts the bicycle.

In the illustrated embodiment, the gripping member has two degrees of freedom; first, the gripping member can move in an arc as the stabilizing arm pivots (as indicated by arrow 406 in FIG. 2). Second, the gripping member can be moved along the length of the arm (as indicated by arrow 408 in FIG. 2) so that it can hold a bicycle down, thus allowing the gripping member to accommodate differently-sized tires of a carried bicycle. More particularly, and as also shown in, for example, FIGS. 7-9 and as described in greater detail below, the stabilizing arm may be selectively pivoted to extend generally across the diameter of a wheel held in the first wheel engagement member so that the gripping member may grip the wheel at a location on the upper half of the wheel. In the illustrated embodiment, the stabilizing arm is configured so that the gripping member engages a location on the wheel that is generally between the two load-bearing support points provided by first wheel engagement member 60 and arched portion 72 of bracing arm 66.

Once the stabilizing arm has been positioned, for example to hold a desired part of a wheel, the gripping member may be fixed in place by being moved along the length of the arm to grip the wheel. In some embodiments, the gripping member can be biased towards a relatively shortened effective length so that the gripping portion automatically cinches down on the desired wheel location. In some embodiments, the effective length can be selected from a continuous range of possible effective lengths, or a discrete set of preselected effective lengths. As one example, the gripping member may interface with the arm via a ratcheting mechanism that allows the gripping member to selectively move relative to the arm, but also allows the gripping member to be locked at a desired effective length.

As can be seen in FIG. 2, both of arms 64, 66 are longitudinally curvilinear. In particular, bracing arm 64 is shown to have a shallow "S"-like profile, whereas stabilizing arm is shown to include a straight lower portion 76 that extends generally outward from the carrier support structure from the mounting point 70, a straight upper portion 78 that carries the gripping member 74, and a bent portion 80. The geometry of the arms, and the collective configuration of the arms and the first wheel engagement member, is explained in greater detail below.

Carrier 40, and more particularly various components thereof, may be configured to provide distinct orientations, such as one or more receiving or carrying positions, and a stowed position. In the illustrated embodiment, the stowed (or storage) position places both arms 64, 66 in a position folded against carrier support structure 20, or in what may be described as a generally horizontal position, such as that shown in FIG. 6. Further, the carrier apparatus itself may then be placed in an inoperative or stowed position by pivoting the central support member 22 into an upright position, such that the angle between the carrier support structure and the back of the vehicle is minimized. A stowed position may thus be suitable for carrying carrier apparatus 10 on a vehicle 200 without a bicycle, or for storage of the carrier apparatus when not in use. The one or more carrying positions, an example of which is shown in FIGS. 1 and 2, place central support member extending rearward from a vehicle to which the carrier apparatus is mounted, with arms 64, 66 pivoted away from, and extending beyond the front edge of, carrier support structure 20. In the carrying position(s), the distal portions of the arms are spaced away from each other to cooperate with the first wheel engagement member to provide three points of engagement with a bicycle wheel. The loading position places the stabilizing arm at an angular distance from carrier support structure sufficient to provide clearance of a bicycle and facilitate its loading onto carrier 40.

Some embodiments may include suitable structure to selectively retain the various components of carrier 40, and/or carrier apparatus 10, in any one or more of such positions. For example, one or both of arms 64, 66 may be provided with a biased pin or similar structure located on the pivot axis, which may align with one or more internal apertures or detents corresponding to the relative pivot positions of the arms in the stowed and carrying positions. Optionally, some embodiments may include permanent or selectively actuable stopping members that may function to limit or otherwise define the range of pivoting motion of one or both arms relative to the carrier support structure and/or each other. Optionally, one or both arms may be biased toward one or more of the stowed, carrying, loading or other positions.

Figure 5:
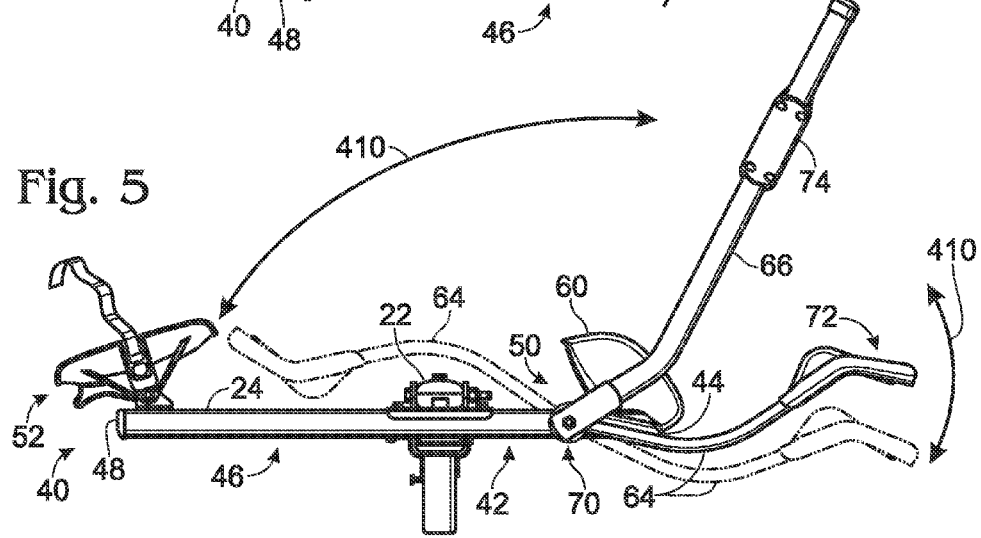
FIG. 5 is another elevation view of the carrier apparatus of FIG. 1, showing an illustrative range of motion of the bracing arm.

FIGS. 4 and 5 show illustrative positions, and ranges of motion, for each of arms 66 and 64, respectively. More particularly, FIG. 4 shows a carrying position of stabilizing arm 66 in solid lines, and also shows a stowed position (which can also be seen in FIG. 6) in dashed lines. FIG. 4 also shows, in dashed lines, stabilizing arm 66 in what may be thought of as a loading position, in which the arm is pivoted to extend generally below a longitudinal axis of the cross member 24. Stabilizing arm 66 may be pivoted among the various positions as indicated by arrow 404. FIG. 5 shows a carrying position of bracing arm 64 in solid lines, and also shows a stowed position (which can also be seen in FIG. 6) in dashed lines. FIG. 5 also shows, in dashed lines, bracing arm 64 in a second illustrative carrying position. Bracing arm 64 may be pivoted among the various positions as indicated by arrow 406. Some embodiments may include greater or lesser ranges of motion, which may correspond to or include more or fewer distinct positions of the illustrated components, than those shown in FIGS. 4 and 5.

As mentioned above, FIG. 6 shows arms 64, 66 in a stowed position for carrier 40. The longitudinal profile of arms 64 and 66 are at least partially complementary to the configuration of the cross member 24 and support beam 22, which allows the arms to clear the central support beam when pivoted to the stowed position. In other words, the "S"-like profile of bracing arm 64 and the bent portion 80 of the stabilizing arm 66 clear the vertical dimension of the cross member 24 to fold generally against the support beam 22. The complementary configurations of arms 64, 66 thus may reduce the overall vertical dimension of the carrier in the stowed position. This reduced vertical dimension in the stowed position may in turn reduce the required rearward clearance from the vehicle to which the carrier apparatus is mounted, when the carrier apparatus is folded to its stowed position, the required storage space when the apparatus is stored or shipped, and so forth.

In the carrying position(s), the bent path defined by stabilizing arm 66 may allow the arm to stabilize a bicycle without contacting or even passing over components of the bicycle frame, such as sensitive components such as the fork, the brakes, and so forth. More particularly, the stabilizing arm is configured to traverse the hub of a held wheel, thereby avoiding the fork, brakes, and other potentially sensitive components of the bike frame that might be easily damaged if motions from driving the vehicle cause the carrier to contact such components. Additionally, in cooperation with the first wheel engagement assembly, which outwardly orients an engaged wheel so that the wheel projects beyond the edge of the carrier support structure, the bent profile of stabilizing arm 66 provides a carrier of compact design, i.e., a carrier that does not span the width of a vehicle, or even the wheelbase of most bicycles.

Figure 7:
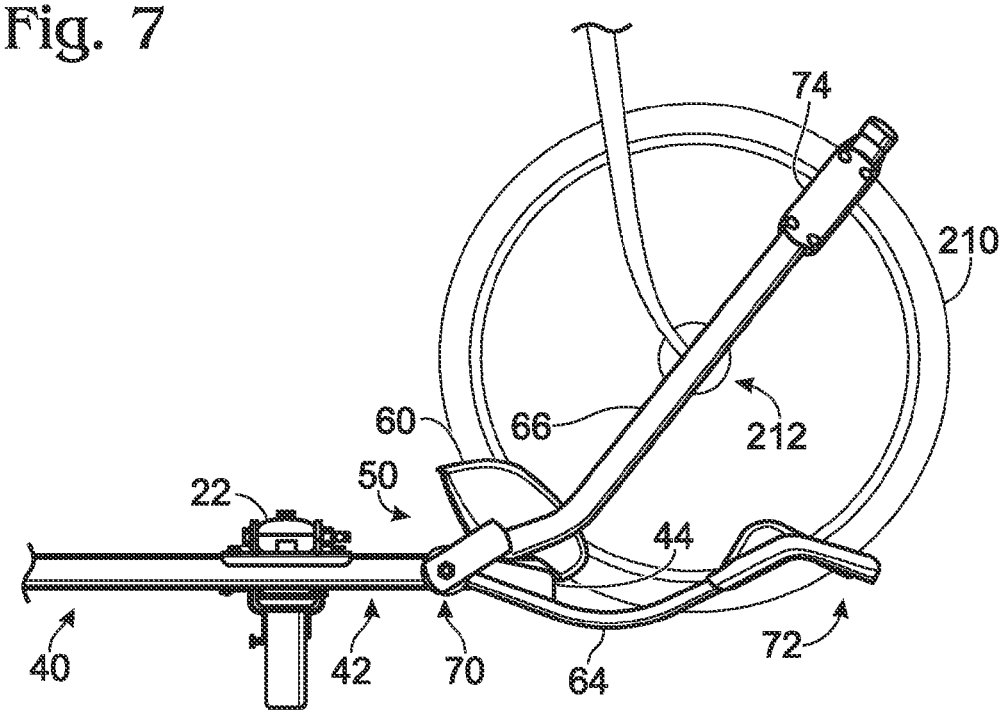
FIG. 7 is an elevation view of the carrier apparatus of FIG. 1, with components of a carrier shown engaging a larger bicycle tire.
Figure 8:
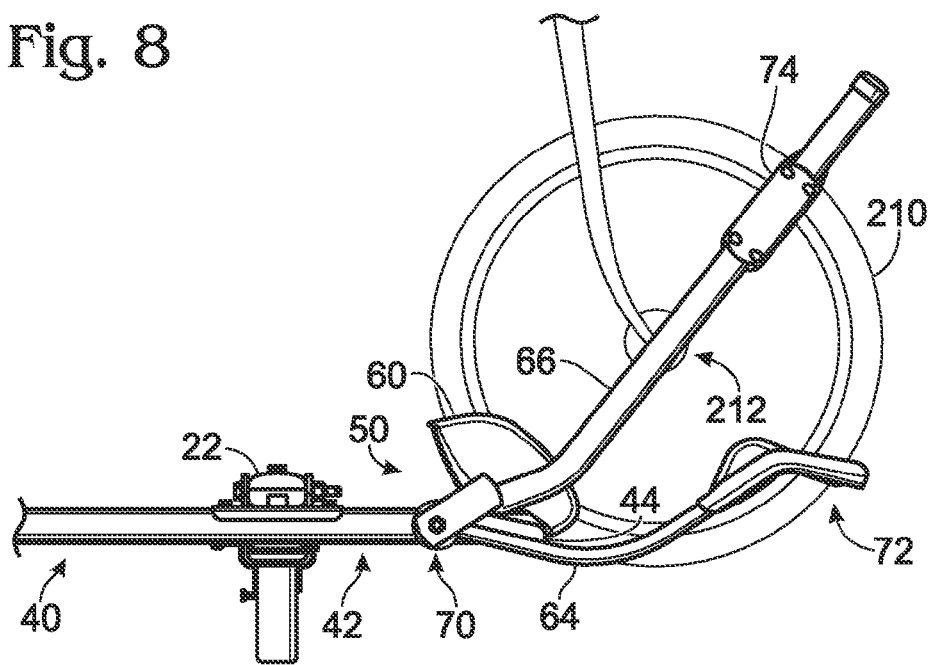
FIG. 8 is an elevation view of the carrier apparatus of FIG. 1, with components of a carrier shown engaging a smaller bicycle tire.

For example, FIGS. 7 and 8 show different sizes a front bicycle wheel 210 engaged in the first wheel support section 50 and stabilized with stabilizing arm 66. In the carrying position(s), bicycle wheel 210 is held in, or against, the first wheel engagement member 60. Member 60 engages a wheel location on the interior quarter of the wheel, and the wheel projects generally outward from the first wheel engagement member so that the wheel center, or hub portion, 212 is horizontally disposed beyond the width or longitudinal dimension of the support structure. In the carrying position, the angle at which bent portion 80 of stabilizing arm 66 couples the lower and upper portions orients the upper portion so that the path defined by the upper portion traverses the center 212 of wheel 210. As can be seen from comparing FIGS. 7 and 8, different sizes of bicycle wheel 210 may be accommodated by adjusting the position of the gripping member 74 along the upper portion 78 of the stabilizing arm. As mentioned above, some embodiments may include one or more components, such as arms 64 and 66, which may be moveable and/or selectively retainable among a range of carrying positions, to accommodate different sizes of bicycle wheel 210. For example, in the illustrated embodiment, bracing arm 64 is positioned so that the distal end of the arm is closer to the distal end of stabilizing arm 66 when holding a smaller bicycle wheel. Other embodiments may be configured to accommodate different wheel diameters with a single carrying position.

Figure 9:
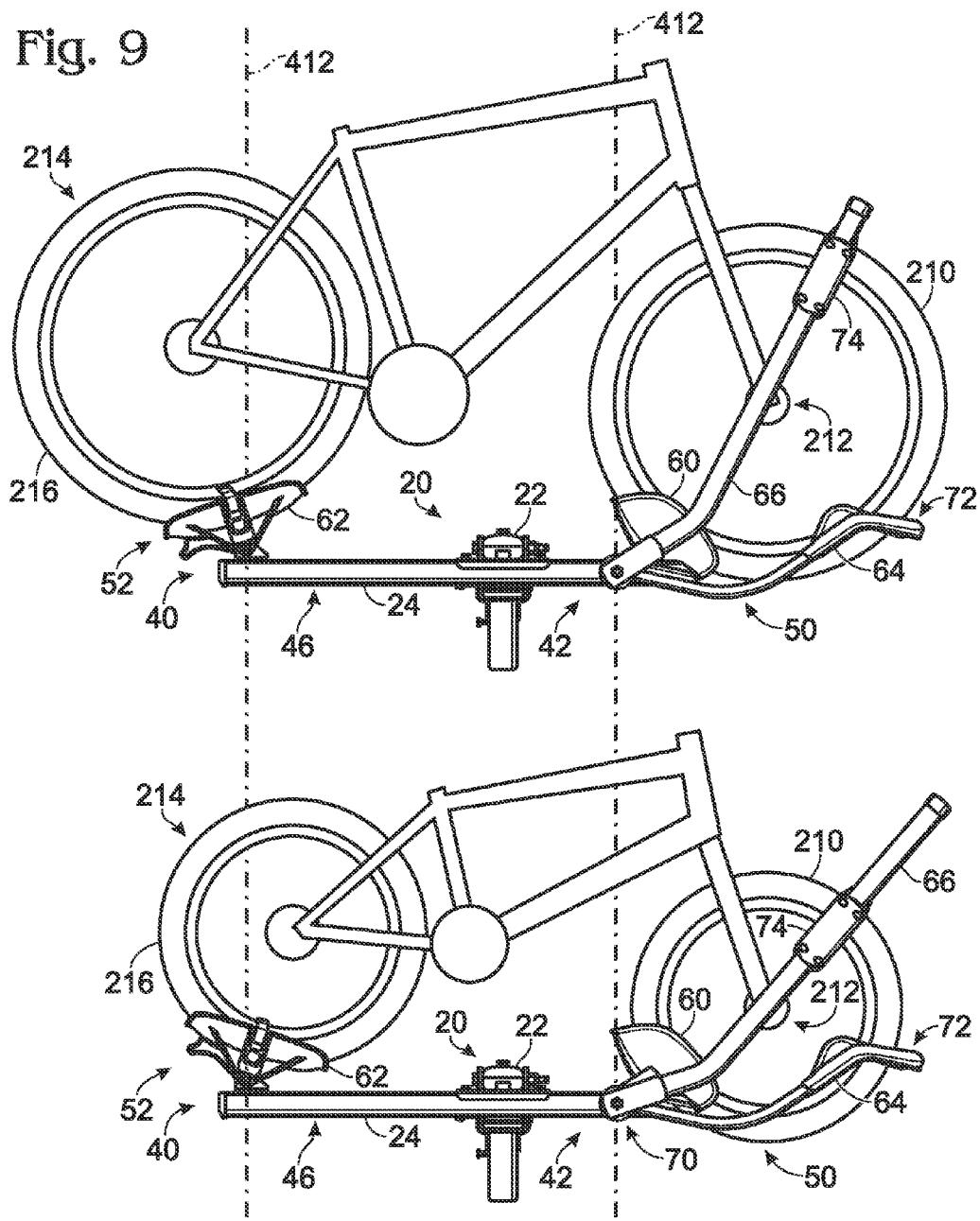
FIG. 9 compares two elevation views of the carrier apparatus of FIG. 1, with components of the carrier shown engaging bicycles having two different sizes.

Although not always the case, different bicycle wheel diameters usually correspond to different bicycle frame sizes and/or styles. For example, adult bicycles not only generally include wheels of larger diameters than children's bicycles, but the frames are also generally larger, and/or the wheelbase of an adult bicycle is typically larger than that of a child's bicycle. FIG. 9 illustrates how carrier 40 carries bicycles having different sizes, by illustrating shows how second wheel engagement member 62 cooperates with first wheel support section 50 and stabilizing arm 66 to accommodate differently-sized bicycle frames and/or bicycles of differing wheelbases.

In FIG. 9, lines 412 indicate a longitudinal dimension of carrier support structure 20; specifically, lines 412 indicate the distance between pivot point 70 and the pivot axis of second wheel engagement member 62. The illustrated longitudinal dimension is for reference only, so that the relative positions of differently-sized bicycles on the carrier may be compared. Carrier 40, as shown in both illustrations of FIG. 9, carries a bicycle 214 having a first wheel 210 (shown as a front wheel) held at three points of engagement, in the manner explained above, provided by first wheel engagement member 60, arched portion 72 of bracing arm 64, and gripping member 74 of stabilizing arm 66. Bicycle 214 also includes a second wheel 216 (shown as a rear wheel) held in second wheel engagement member 62 and secured via the strap and latch arrangement of the engagement member. The bicycle in the upper illustration is larger than, and has a larger wheelbase compared to, the bicycle in the lower illustration. As such, the upper illustrated bicycle may represent an adult-sized bicycle, whereas the lower illustrated bicycle may represent a child's bicycle. With both bicycles, however, the different wheelbase is accommodated by means of the second wheel engagement member 62, which pivots to receive a portion of the rear bicycle wheel 216. The degree to which the second wheel engagement member 62 pivots, in the illustrated embodiment, is determined primarily by the wheelbase of the bicycle and the degree to which the front wheel projects beyond the edge of the carrier support structure when engaged by first wheel engagement member 60. Other embodiments may thus be configured to accommodate a desired range of bicycle wheel sizes, frames, and wheelbases. As mentioned above, other embodiments may include a configuration of wheel engagement members different than those shown in the illustrated embodiment. For example, a second wheel engagement member may additionally or alternatively have a slidably mounted configuration, such as for movement along the carrier support structure.

Figure 10:
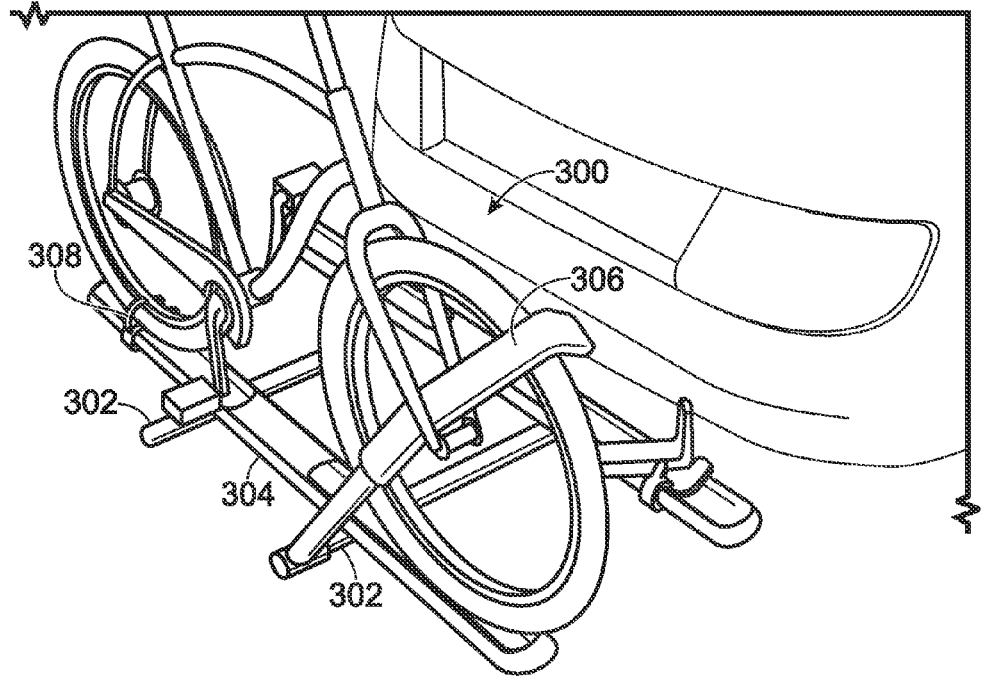
FIGS. 10-13 are perspective views of alternative carrier apparatus embodiments.

FIGS. 10-13 show modified bicycle carrier examples. In FIG. 10, bicycle carrier 300 includes U-shaped support arm 302 for supporting extruded aluminum beams with molded plastic trays to locate bicycle wheels. Pivoting arm 306 rotates around U-shaped support arm 302 to secure a bicycle on beam 304 in conjunction with wheel strap 308.

Figure 11:
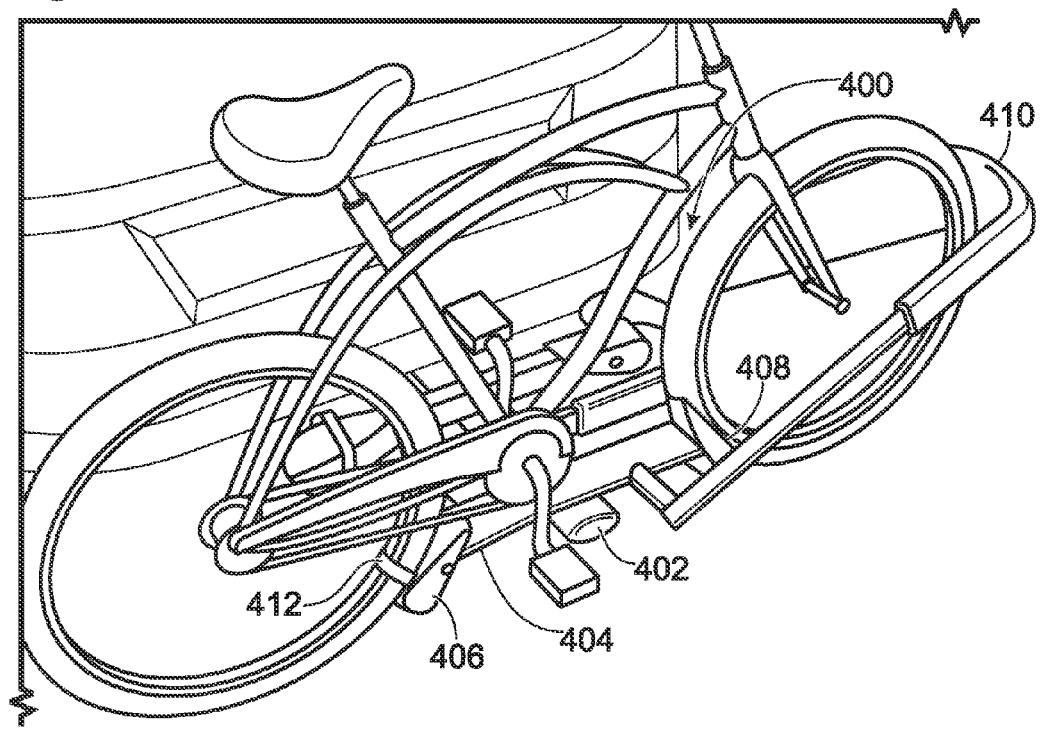

As shown in FIG. 11, bicycle carrier 400 uses single support 402 from the hitch to support two short beams or cross members 404 with one pivoting taco 406 and one fixed taco 408. Indexing swing arm 410 holds the front tire in place against fixed taco 408, and strap 412 holds the rear tire down to rear taco 406.

Figure 12:
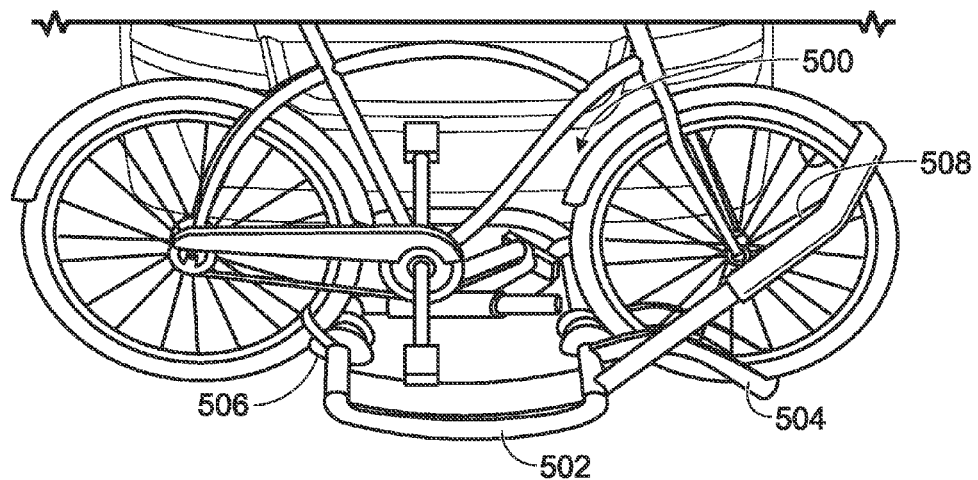

As shown in FIG. 12, bicycle carrier 500 includes hoop-shaped support structure 502 with front and rear wheel trays 504 and 506 mounted to the hoop. Rear wheel tray 506 pivots around the hoop 502. Front wheel tray 504 pivots for folding during storage and locks to hoop 502 when supporting the bicycle wheel. Wheel support arm 508 pivots on hoop 502.

Figure 13:
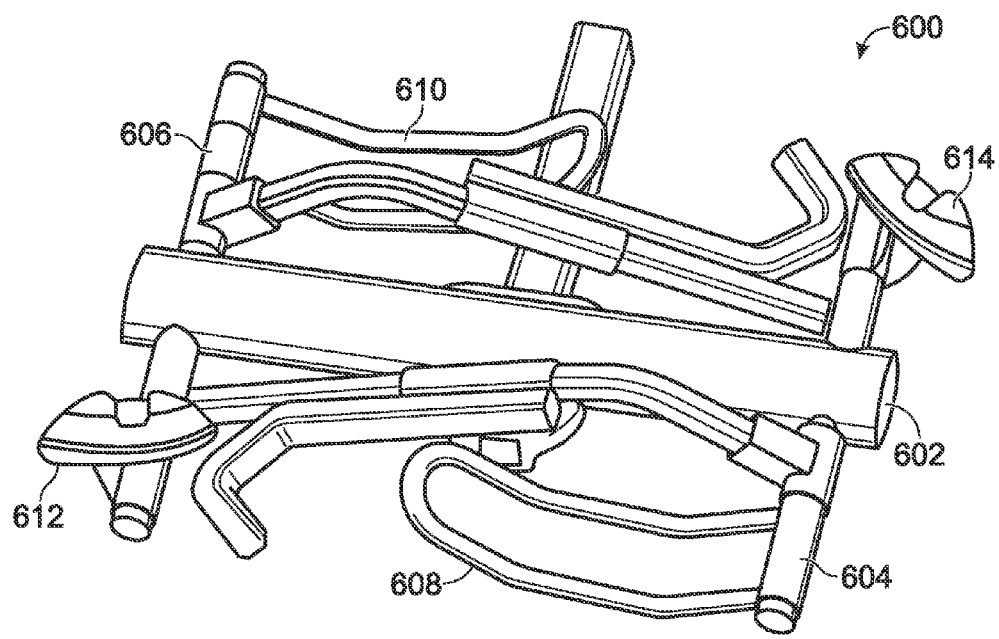

As shown in FIG. 13, bicycle carrier 600 includes single central spine 602 to support cross members 604 and 606 that in turn support pivoting hoops 608, 610, and rear tacos 612, 614 with appropriate retaining straps.

Assuming that a carrier is initially in a stowed position (such as shown in FIG. 6), bicycle loading may thus be accomplished by first pivoting the bracing arm 64 to a carrying position in which the bracing arm is cantilevered generally outward from the carrier support structure. The stabilizing arm 66 may be pivoted generally outward from the carrier support structure to a "loading" position, such as the position in FIG. 4 in which the stabilizing arm is swung beyond the angular distance of the bracing arm, or to any suitable position that provides sufficient clearance so that a bicycle wheel may be positioned in the first wheel support section 50. A bicycle is then loaded to the carrier by placing the front wheel against the two load-bearing support points provided by the first wheel support section 50. As the wheel is engaged in the support section, the angle of the first wheel engagement member 60 guides the wheel to engage the arched portion 72 of the bracing arm. The rear wheel then engages the second wheel engagement member 62 of second wheel support section 52, which pivots to accommodate the position of the wheel regardless of the wheelbase of the bicycle. Stabilizing arm 66 may then be pivoted from the loading position to the carrying position, in which the upper portion of the arm passes over the hub portion of the front wheel and the gripping member is positioned to engage a third wheel location on the upper half of the wheel and generally between the wheel locations engaged by the two load-bearing support points provided by the first wheel support section 50. The gripping member may then be moved to grip the third wheel location and fixed in place, securing the bicycle wheel against carrier 40. The wheel retention components may then be used to secure the wheel engaged in second wheel support section 52.

Embodiments of the carrier apparatus may include one or more additional security mechanisms, such as looped cables, elastic members, and so forth. Stabilizing arm 66 may itself function as a passive security mechanism for bicycles that include a quick-release assembly, such as a lever, on the hub section of a wheel engaged in the first wheel support section 50. The upper portion of stabilizing arm 66 traverses the hub of a held wheel, which may prevent a quick-release assembly from being accessed or properly manipulated, in turn preventing disengagement of the wheel from the bicycle frame.

The specific embodiments disclosed and illustrated herein are not intended, nor should be considered, to limit the scope of the invention as understood by a person having ordinary skill in the art. Numerous variations may be made without departing from the spirit and scope of the invention recited in the appended claims. The subject matter of the invention includes all novel and non-obvious combinations of elements, concepts, components, features, functions, and/or properties disclosed herein.

We claim:

1. A carrier apparatus for carrying a bicycle on a vehicle, comprising:
   a carrier support structure having a first end portion, a middle portion, and a second end portion;
   a first wheel support section coupled to the first end portion of the carrier support structure, the first wheel support section including:
      a wheel engagement member mounted on the carrier support structure and configured to engage the first wheel at a first wheel location, thereby providing a first support point for the wheel; and
      a bracing arm pivotally attached to the first end portion of the carrier support structure independent from the wheel engagement member and configured to selectively move, relative to the carrier support structure, between a stowed position and a carrying position in which the bracing arm is adapted to engage the first wheel at a second wheel location, thereby providing a second support point for the wheel, wherein the first and second support points are configured to support a wheel so that a central point of the wheel extends beyond the first end portion of the carrier support structure when the bracing arm is in the carrying position;
   a second wheel support section coupled to the second end portion of the carrier support structure and configured to engage a second wheel of the bicycle; and
   a stabilizing arm coupled to the carrier support structure and including a gripping member configured to selectively grip the first wheel at a third wheel location when the wheel is engaged with the first wheel engagement section,
   wherein a distal end of the bracing arm is pivotable between the stowed position in which the distal end is directed toward the second wheel support section, and the carrying position in which the distal end is directed in an opposite direction from its orientation in the stowed position.

2. The carrier apparatus of claim 1, wherein the bracing arm is coupled to the carrier support structure for pivotable movement between the stowed and carrying positions.

3. The carrier apparatus of claim 1, wherein the second wheel support section includes a second wheel engagement member, and the second wheel engagement member is pivotably mounted to the carrier support structure.

4. The carrier apparatus of claim 1, wherein the bracing arm is cantilevered outward relative to the carrier support structure in the carrying position.

5. The carrier apparatus of claim 1, wherein the gripping member of the stabilizing arm and the second support point each extend beyond the first end portion of the carrier member.

6. The carrier apparatus of claim 1, wherein the wheel engagement member and the bracing arm form a wheel cradle, the wheel cradle including a first end having the first support point and a second end having the second support point, the second end being pivotable between a carrying position in which the second end is extended beyond the front end portion of the carrier member, and a storing position in which the second end is proximate the carrier support structure.

7. A carrier apparatus for carrying a bicycle on a vehicle, comprising:
a carrier support structure having a front portion defined by a front edge and a rear portion defined by a rear edge, each portion including a wheel support section configured to support a wheel of the bicycle, the front wheel support section further including a wheel engagement member and a bracing arm with a distal end that is oriented outward relative to a frame in a carrying position such that an axial center of a wheel engaged by the bracing arm projects beyond the front edge when the bracing arm is in the carrying position, and that is oriented inward relative to the frame when the bracing arm is in a stowed position, the bracing arm being directed in opposite directions in the stowed and carrying positions, wherein the bracing arm is pivotally connected to the carrier support structure independent from the wheel engagement member;
a support arm coupled to the carrier support structure, the support arm including:
a pivot point located rearward of the front wheel support section at which the support arm pivots along a lateral axis,
a lower portion extending from the pivot point;
an upper portion that includes a gripping member configured to selectively grip the wheel when the wheel is engaged with the wheel engagement member and the bracing arm; and
a bent portion connecting the lower portion to the upper portion at an angle sufficient to orient the upper portion so that a path defined by the upper portion traverses a wheel center point of the wheel supported by the bracing arm, wherein the lower, upper, and bent portions are substantially planar in a plane that is perpendicular to the lateral axis and parallel to the carrier support structure.

8. The carrier apparatus of claim 7, wherein the support arm includes a biasing mechanism that biases the gripping member toward the bent portion.

* * * * *